(No Model.) 2 Sheets—Sheet 1.
G. H. HUTTON & G. H. HUTTON, Jr.
JOINTED IRON FOR VEHICLE SEATS.
No. 449,419. Patented Mar. 31, 1891.
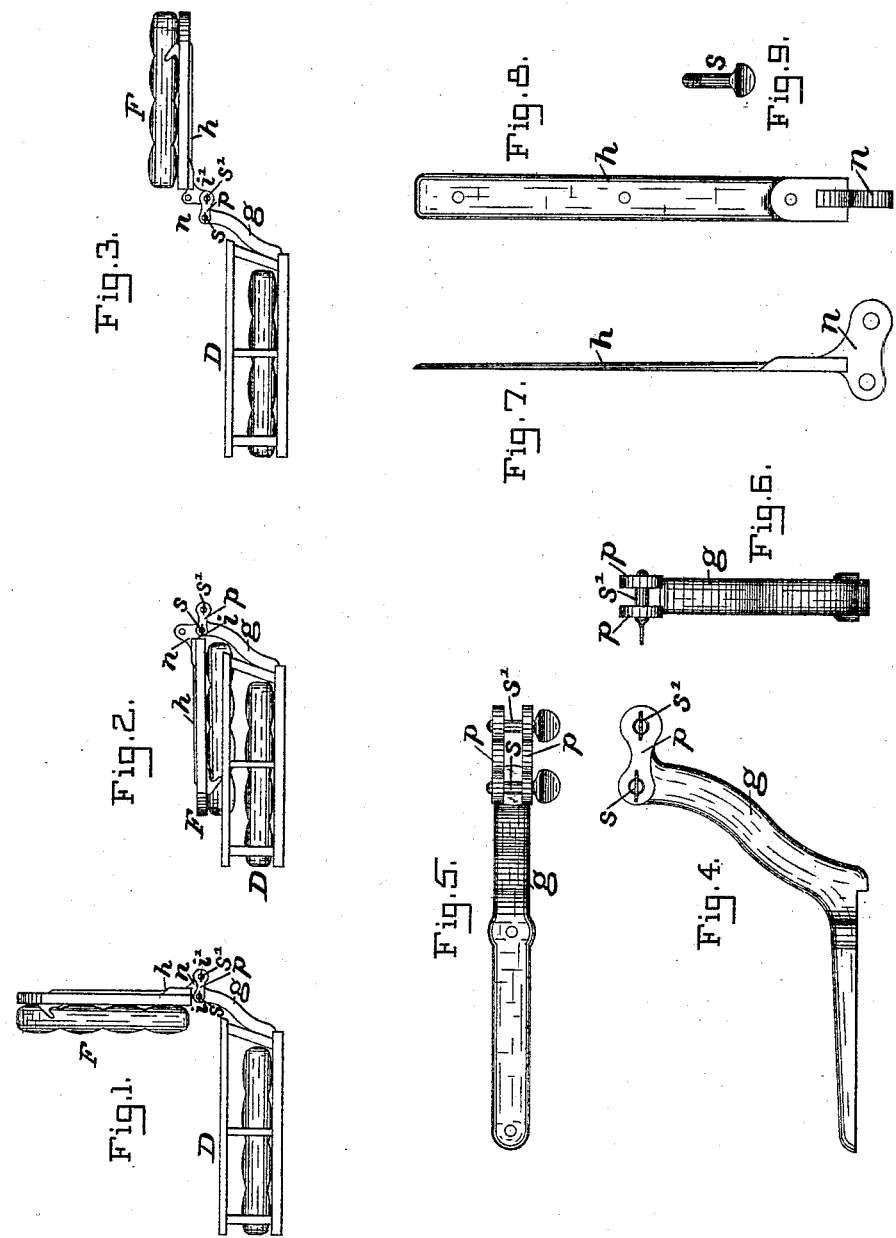
WITNESSES:
Otto H. Ehlers.
J. P. Davis.
INVENTORS:
George H. Hutton,
George H. Hutton, Jr.
BY Chas B. Mann
ATTORNEY.

(No Model.) 2 Sheets—Sheet 2.
G. H. HUTTON & G. H. HUTTON, Jr.
JOINTED IRON FOR VEHICLE SEATS.
No. 449,419. Patented Mar. 31, 1891.
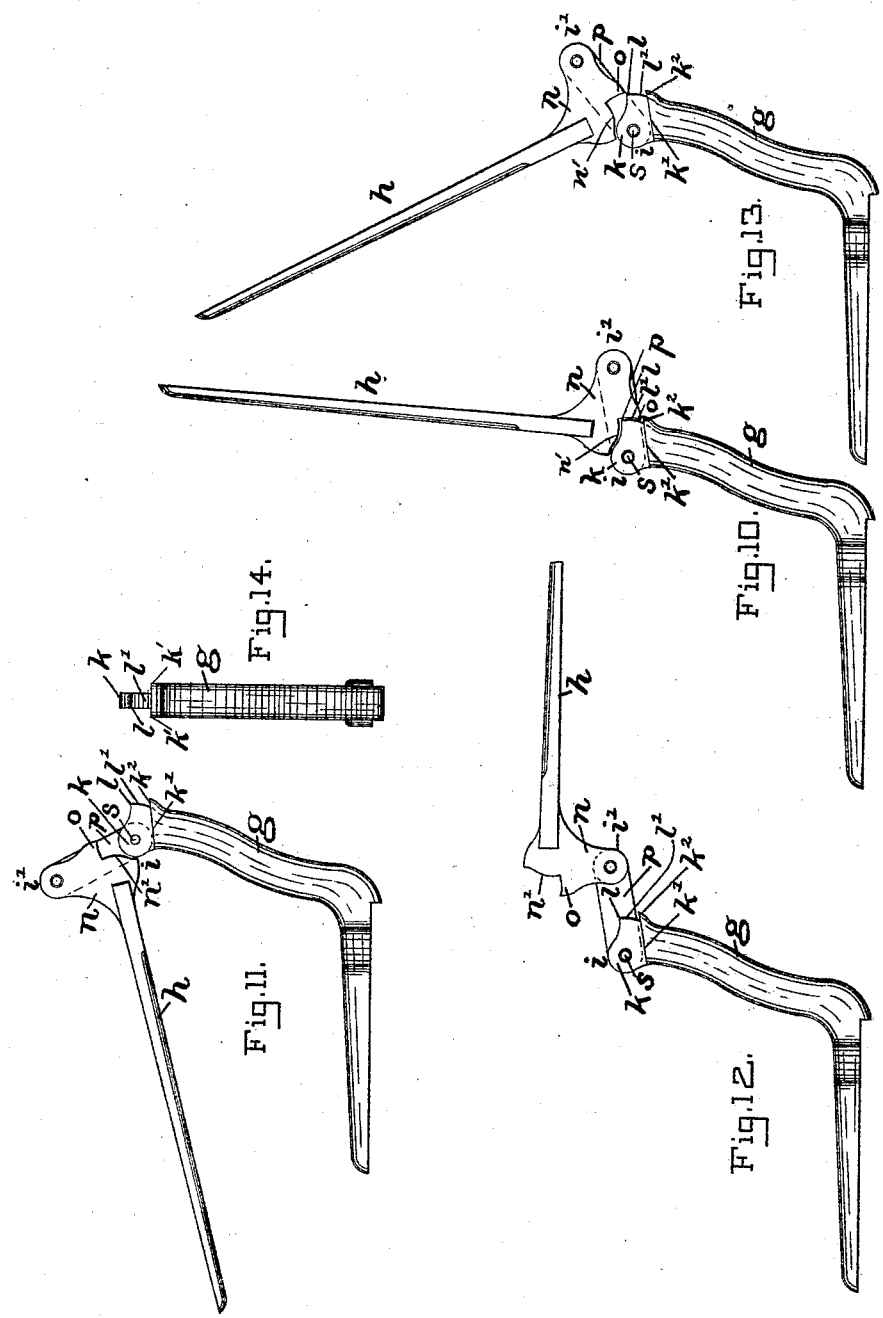
WITNESSES:
Otto H. Ehlers.
J. P. Davis.
INVENTORS:
George H. Hutton,
George H. Hutton, Jr.
BY Chas. B. Mann
ATTORNEY.

UNITED STATES PATENT OFFICE.

GEORGE H. HUTTON AND GEORGE H. HUTTON, JR., OF BALTIMORE, MARYLAND.

JOINTED IRON FOR VEHICLE-SEATS.

SPECIFICATION forming part of Letters Patent No. 449,419, dated March 31, 1891.

Application filed December 24, 1890. Serial No. 375,671. (No model.)

*To all whom it may concern:*

Be it known that we, GEORGE H. HUTTON and GEORGE H. HUTTON, Jr., citizens of the United States, residing at Baltimore, in the State of Maryland, have invented certain new and useful Improvements in Jointed Irons for the Lazy-Backs of Vehicle-Seats, of which the following is a specification.

This invention relates to jointed irons for the lazy-backs of jump-seats for vehicles, and has for its object to provide irons by whose adjustment the lazy-back can be turned forward upon the seat and turned backward to a horizontal position to serve as a seat.

To this end the invention consists in a double-jointed iron for lazy-backs, which comprises two sections secured to the seat and back, respectively, and connected by two joints, one of which is brought into play when turning the lazy-back to its forward position and the other when turning it to its backward position.

The invention is illustrated in the accompanying drawings, in which two forms of our device are shown.

Figure 1 represents a side view of a jump-seat provided with one form of our improved iron and shown with the lazy-back up, as when the jump-seat is employed as a rear seat; Fig. 2, a similar view showing the lazy-back turned down upon the seat, as when occupying a position beneath the front seat; Fig. 3, a side view showing the lazy-back turned back to a horizontal position, where it serves as the rear seat of a "dos-à-dos;" Figs. 4, 5, 6, 7, 8, and 9, enlarged detail views of the parts which go to make up the iron; Figs. 10, 11, and 12, corresponding views to Figs. 1, 2, and 3, representing another form of our improved iron; Fig. 13, a side view of this latter form of iron, showing the position to which the parts are brought preparatory to shifting the lazy-back to its turned-backward position; and Fig. 14, a rear view of the section of the iron for attachment to the seat.

The letter D designates the seat, and F the lazy-back, and it might be well to state, primarily, that the various positions of these parts with relation to the front seat and vehicle-body are clearly shown and described in our companion application for a patent of even date, and reference is made to such application for a full understanding of the general arrangement of parts in a convertible vehicle.

The jointed iron comprises two sections $g$ $h$. One of these sections $g$ is for attachment to the seat D and projects up from the back edge thereof and forms a rigid standard, and may incline slightly to the rear, as shown. The other section $h$ is for attachment to the back F, and in securing it to the first-named section two joints are employed. When the back is turned forward, one joint $i$ is brought into play, and when it is turned backward the other joint $i'$ is brought into play.

In the form shown in Figs. 1, 2, 3, 4, 5, 6, 7, 8, and 9 these two joints are constructed and arranged as follows: The seat section or standard $g$ has at its upper end a rigid rearward-projecting joint-bar $p$, and the back-section has a corresponding rigid joint-arm $n$. These two rearward-projecting joint parts $p$ $n$ lap across each other, and the two pins forming the pivots of the joints $i$ $i'$ pass through the said joint parts. We prefer to form the joint-bar $p$ of the seat-section double, comprising two members which fit on opposite sides of the joint-arm $n$ of the back-section $h$. One pivot-pin $s$ forms the front joint $i$, while the other $s'$ passes through the rearward ends of the said parts $p$ $n$ and forms the rear joint $i'$. In the present instance the said pins are both removable, and may consist of thumb-screws, as shown, the screw-thread being only on the extremity.

It will be observed that with both the pivot-pins in place the two joints will be held rigid and will be enabled to resist pressure applied against the back F when the latter is in an upright position. To adjust the back in the turned-forward position, the rear joint-pin $s'$ is taken out and the said back turned forward on the front pivot $s$. To adjust it in the turned-backward position, the front pin $s$ is taken out and the said back turned backward on the rear pivot $s'$.

In the form shown in Figs. 10, 11, 12, 13, and 14 the two joints of the iron are constructed and arranged as follows: The seat section or standard $g$ has at its upper end a joint-ear $k$ and a stop-shoulder $k'$ at two opposite sides and also a stop-shoulder $k^2$ at the rear side. The forward part of this joint-ear is rounded but the rearward part projects toward the rear stop-shoulder $k^2$, and has an upper angular corner $l$ and a rear face $l'$, that is curved concentric with the pivot $s$. The back-section $h$ has at its lower end a rearward-projecting joint-arm $n$ of the same thickness as the joint-ear $k$ on the other section. This joint-arm has a hook or beak $o$ of shape to correspond with the rear face $l'$ of the joint-ear $k$ of the other section, and the edge $n'$ of the joint-arm, which is proximate to the top edge of the said ear, has a suitable shape to correspond therewith. A short link-bar $p$ laps across the side of the joint-ear $k$ and the side of the joint-arm $n$, and the pivot-pin which forms the joint $i$ passes through the said link-bar and the joint-ear $k$ and the pin of the joint $i'$ passes through the link-bar and the joint-arm $n$. We prefer to employ two link-bars $p$, one at each side. When the back-section $h$ is in an upright position, as in Fig. 10, the joint-arm edge $n'$ rests in contact with the top edge of the joint-ear $k$, and its hook or beak $o$ is in contact with the rear face $l'$. When the parts are in this position, it will be seen that the back-section $h$ cannot turn backward nor have any movement on its rear joint $i'$. Thus this construction of parts serves to hold the two joints rigid when the back-section is in an upright position. The hook or beak $o$, however, does not hinder the back-section $h$ from turning forward on the front joint $i$, as shown in Figs. 13 and 11. To adjust the back to an ordinary turned-forward position, it is only necessary to turn the lazy-back F on the front pivot $i$ of the iron. The position which the two joints will then have is shown in Fig. 11. To adjust the back in the turned-backward position, first turn forward the lazy-back F on the front pivot $i$ until the hook or beak $o$ of the joint-arm $n$ has passed the angular corner $l$ of the joint-ear $k$. Then the lazy-back may be pushed forward to draw the joint-arm $n$ from between the links $p$. The lazy-back can now be turned backward on the rear pivot $i'$ to the position shown in Fig. 12. This latter construction is the same as that shown in our application filed December 24, 1890, Serial No. 375,670, and therein claimed. In this present application we make no specific claim to the same.

It will be seen that the objects in view can be readily and conveniently attained with either form of double-jointed iron.

It is evident that changes may be made in the construction and arrangement of the several parts composing our invention, and therefore the invention is not limited to the construction shown.

Having thus described our invention, what we claim as new, and desire to secure by Letters Patent, is—

1. A double-jointed iron for the lazy-backs of vehicle-seats, comprising two sections secured to the back and seat, respectively, and connected by two joints, one of which is brought into play when turning the lazy-back to its forward position and the other when turning it to its backward position.

2. An iron for the lazy-backs of vehicle-seats, comprising two sections $h$ $g$, secured to the back and seat, respectively, with an end of one section proximate to an end of the other, and two joints $i$ $i'$ between the two sections, one of said joints being at the front side of the iron and the other at the rear side, as set forth.

3. An iron for the lazy-backs of vehicle-seats, comprising two sections $h$ $g$, secured to the back and seat, respectively, with an end of one section proximate to an end of the other and one of said proximate ends having a rearward-projecting arm $n$ and two joints $i$ $i'$ between the said proximate ends, the pivot of one of the joints passing through the said rearward-projecting arm, as set forth.

4. A double-jointed iron for the lazy-backs of vehicle-seats, comprising two sections secured to the back and seat, respectively, and each provided with a rearward-projecting joint-arm, the one lapping across the other and connected by two removable pivot-pins $s$ $s'$, substantially as and for the purpose described.

In testimony whereof we affix our signatures in the presence of two witnesses.

GEORGE H. HUTTON.
GEORGE H. HUTTON, JR.

Witnesses:
JNO. T. MADDOX,
F. P. DAVIS.